US008727444B2

(12) United States Patent
Chen et al.

(10) Patent No.: US 8,727,444 B2
(45) Date of Patent: May 20, 2014

(54) INFANT CARRIER APPARATUS HAVING A BACKREST AND ITS ADJUSTING METHOD

(75) Inventors: Shun-Min Chen, Taipei (TW); Zong Wang Cui, Central Hong Kong (HK)

(73) Assignee: Wonderland Nurserygood Company Limited, Hong Kong (HK)

( * ) Notice: Subject to any disclaimer, the term of this patent is extended or adjusted under 35 U.S.C. 154(b) by 288 days.

(21) Appl. No.: 13/245,313

(22) Filed: Sep. 26, 2011

(65) Prior Publication Data

US 2012/0074747 A1 Mar. 29, 2012

(30) Foreign Application Priority Data

Sep. 27, 2010 (CN) .......................... 2010 1 0298793

(51) Int. Cl.
*B60N 2/20* (2006.01)
(52) U.S. Cl.
USPC ...................................... 297/383; 297/354.12
(58) Field of Classification Search
USPC .................................. 297/301.5, 354.12, 383
See application file for complete search history.

(56) References Cited

U.S. PATENT DOCUMENTS

| 5,018,754 | A | * | 5/1991 | Cheng | 280/47.4 |
| 5,344,216 | A | * | 9/1994 | Suominen | 297/383 |
| 6,086,087 | A | * | 7/2000 | Yang | 280/658 |
| 6,676,140 | B1 | * | 1/2004 | Gondobintoro | 280/33.993 |
| 6,921,135 | B2 | * | 7/2005 | Ellis et al. | 297/344.18 |
| 2010/0102535 | A1 | * | 4/2010 | Zhong | 280/650 |

FOREIGN PATENT DOCUMENTS

JP 5687971 12/1954

* cited by examiner

*Primary Examiner* — Philip Gabler
(74) *Attorney, Agent, or Firm* — David I. Roche; Baker & McKenzie LLP

(57) ABSTRACT

An infant carrier apparatus comprises a support frame including a seat assembly that has a longitudinal axis extending from a front end to a rear end thereof, and a backrest assembly including a backrest frame and at least a holder socket, the backrest frame being mounted with the support frame via the holder socket, and the holder socket being adjustable along the longitudinal axis between a first position and a second position. In other embodiments, a method of adjusting the backrest assembly of the infant carrier apparatus is also described.

20 Claims, 9 Drawing Sheets

INFANT CARRIER APPARATUS HAVING A BACKREST AND ITS ADJUSTING METHOD

CROSS-REFERENCE TO RELATED APPLICATION(S)

This application claims priority to Chinese Patent Application No. 201010296793.8 filed on Sep. 27, 2010.

BACKGROUND OF THE INVENTION

1. Field of the Invention

The present invention relates to infant carrier apparatuses, and more particularly to infant carrier apparatuses having a backrest and its adjusting method.

2. Description of the Related Art

Strollers are a type of infant carrier apparatuses that are commonly used to walk a child. In most strollers, the child is placed facing forward, and the parent can push the stroller in movement from the rear of the stroller, which does not allow the seated child to see the parent. To remedy this issue, certain strollers currently available on the market may have a construction that allows to seat the child facing either forward or rearward. These strollers usually have a backrest that is adjustable to incline rearward to seat the child facing forward, or to incline forward to seat the child facing rearward. To permit forward and rearward seating configurations, the stroller also has front and rear seat portions connected with each other, which makes it have a total seating surface that is larger than conventional strollers with only one forward seating configuration. As a result, the conventional stroller with forward and rearward seating capabilities has a substantially larger size, which may not be convenient in use.

Therefore, there is a need for an improved infant carrier apparatus that is more compact and address at least the foregoing issues.

SUMMARY

The present application describes an infant carrier apparatus having a backrest assembly, and a method of adjusting the position of the backrest assembly relative to the seat assembly so that the useful surface area of the seat assembly can be efficiently used for modifying the orientation of the backrest.

In one embodiment, the infant carrier apparatus comprises a support frame including a seat assembly that has a longitudinal axis extending from a front end to a rear end thereof, and a backrest assembly including a backrest frame and at least a holder socket, the backrest frame being mounted with the support frame via the holder socket, and the holder socket being adjustable along the longitudinal axis between a first position and a second position.

The present application also describes a method of adjusting a backrest assembly of an infant carrier apparatus. The infant carrier apparatus can include a support frame having a seat assembly, a backrest frame, and at least a holder socket through which the backrest frame is mounted with the support frame, and the support frame further including a plurality of restraint elements adapted to restrainedly position the holder socket at different locations. The method can comprise removing a locked state of the holder socket being located at a first position, adjusting the holder socket from the first position to a second position, wherein the first and second positions are spaced apart from each other along a longitudinal axis of the seat assembly, and locking the holder socket in place at the second position.

With the constructions described herein, the backrest assembly can be adjustable to lie adjacent to either of a front end or a rear end of the seat assembly. Accordingly, the infant carrier apparatus can be desirably adjustable to a seating configuration facing forward or rearward. Another advantage is the ability to modify the orientation of the backrest assembly without the need of a larger seat area.

DETAILED DESCRIPTION OF THE EMBODIMENTS

Figure 1:
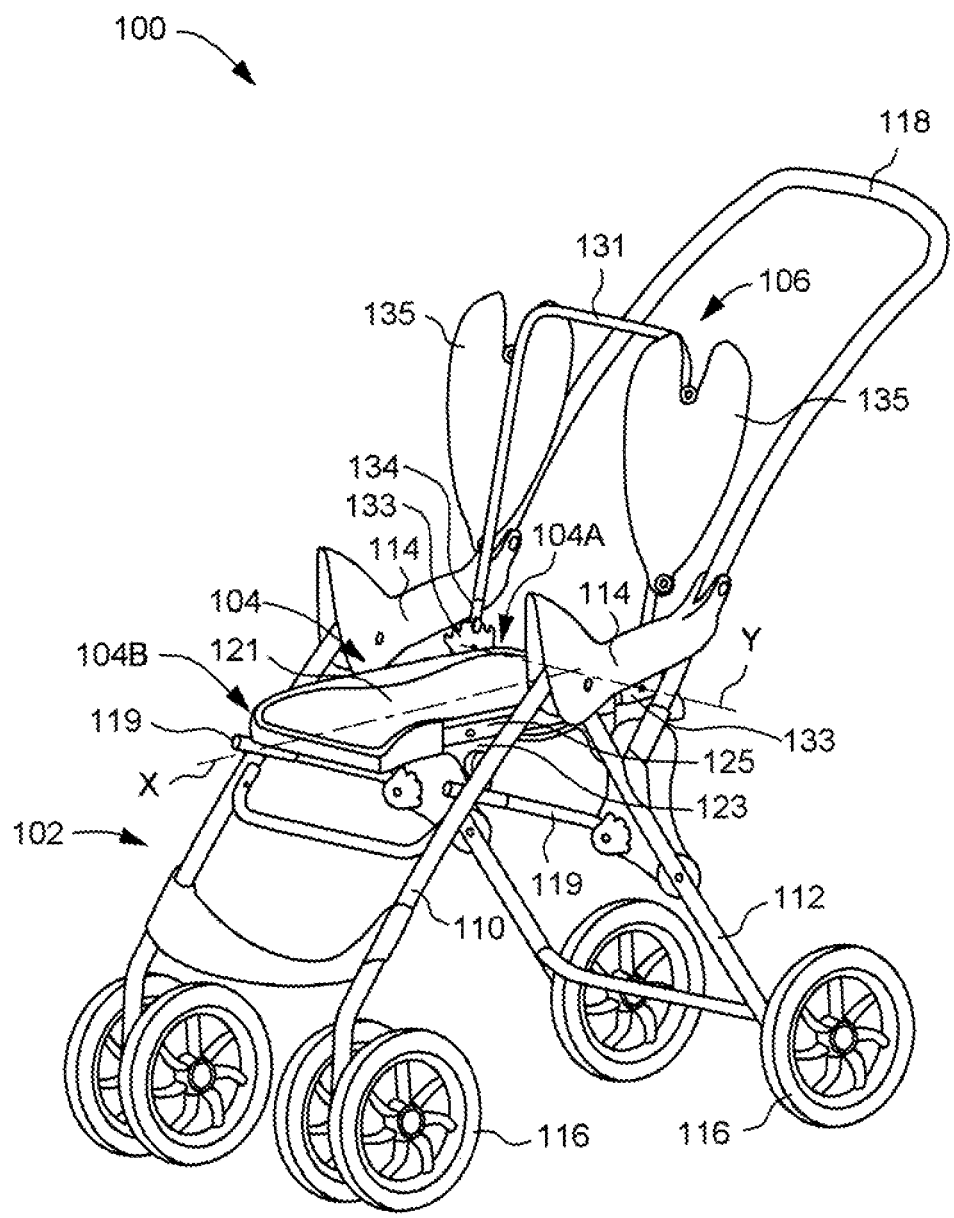
FIG. 1 is a perspective view illustrating one embodiment of an infant carrier apparatus.

The present application describes an infant carrier apparatus having a backrest assembly and its adjusting method. FIG. 1 is a schematic perspective view illustrating one embodiment of an infant carrier apparatus 100. The infant carrier apparatus 100 is exemplary a stroller apparatus including a support frame 102 having a seat assembly 104, and a backrest assembly 106. The support frame 102 can comprise a front leg frame 110, a rear leg frame 112, armrests 114, a plurality of wheels 116, and a handle 118. The armrests 114 can be assembled at the left and right sides of the seat assembly 104, and can be connected with upper ends of the front and rear leg frames 110 and 112. The wheels 116 can be mounted at lower ends of the front and rear leg frames 110 and 112. The handle 118 can have a generally U-shape formed from the assembly of multiple tube portions. Left and right side segments of the handle 118 can be respectively connected pivotally with rear ends of the armrests 114, and also connect with the rear leg frame 112. The left and right sides of the support frame 102 can also include side bar linkages 119, each of which has a front end connected with the front leg frame 110 and a rear end connected with the rear leg frame 112.

In one embodiment, the seat assembly 104 can include a seat board 121. In alternate embodiment, the seat assembly 104 can also include a fabric and a cushion element assembled together to form a seat surface. The seat assembly 104 can define a longitudinal axis X that extends from a rear end 104A to a front end 104B of the seat assembly 104 generally in a same direction as that of the side bar linkages 119. Mount brackets 123 can be respectively protruding from the left and right sides of the seat board 121. Each mount bracket 123 can extend downward from the seat board 121, and respectively connect with one corresponding side bar linkage 119 and the rear leg frame 112. Accordingly, the seat assembly 104 can be supported by the support frame 102. The support frame 102 can also include guide rails 125 respectively affixed at the left and right sides of the seat board 121. The guide rails 125 can extend generally parallel to the longitudinal axis X, and are movably mounted with the backrest assembly 106.

Referring again to FIG. 1, the backrest assembly 106 can include a backrest frame 131, holder sockets 133, and latch elements 134. In one embodiment, the backrest frame 131 can have a generally U-shape from the assembly of multiple tube portions. The left and right side segments of the backrest frame 131 can be respectively affixed with side resting panels 135. The left and right side segments of the backrest frame 131 can also have distal ends that are respectively connected pivotally with the holder sockets 133. Accordingly, the backrest frame 131 can rotate about a pivot axis Y relative to the holder sockets 133 and the seat assembly 104 for adjusting the inclination of the backrest frame 131 relative to the seat assembly 104. Moreover, the holder sockets 133 can respectively slide back and forth along the guide rails 125 to adjust the position where the backrest assembly 106 is connected with the seat assembly 104. In one embodiment, the backrest assembly 106 can be movably adjusted between a first position and a second position by respectively sliding the holder sockets 133 along the guide rails 125. In the first position, each of the holder sockets 133 can be located adjacent to the rear end 104A of the seat assembly 104. In the second position, each of the holder sockets 133 can be located adjacent to the front end 104B of the seat assembly 104.

Figure 2:
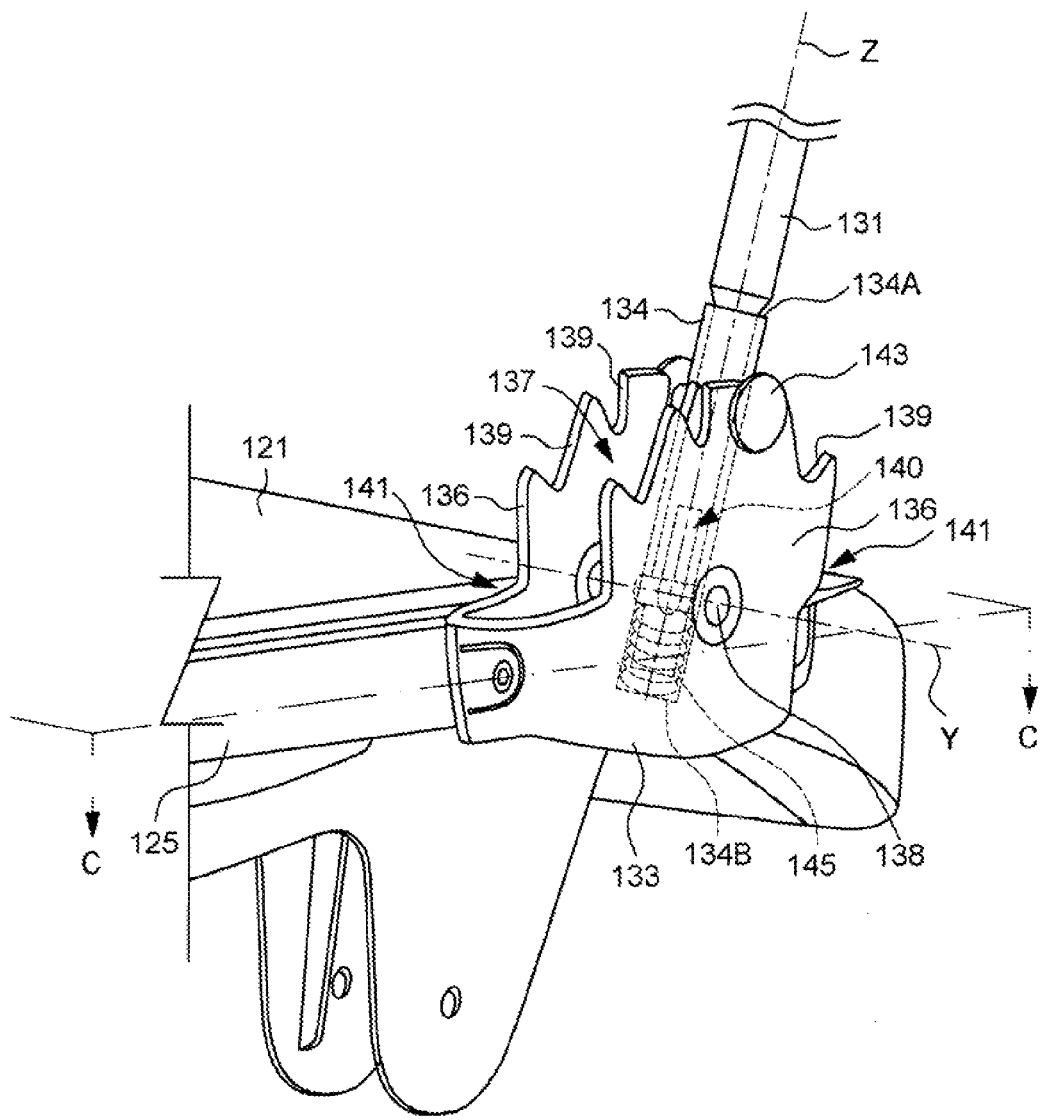
FIG. 2 is a schematic view illustrating the assembly of a backrest frame, a holder socket, and a latch element in the infant carrier apparatus.

FIG. 2 is a schematic view illustrating the holder socket 133 and the latch element 134 assembled at a side distal end of the backrest frame 131. It will be understood that the other holder socket 133 and latch element 134 can have a same construction and be assembled symmetrically in a similar way at the other side of the backrest frame 131. As shown, the holder socket 133 can include two parallel sidewalls 136, and a gap 137 delimited between the two sidewalls 136. The latch element 134 can be mounted near a distal end of the side segment of the backrest frame 131. In particular, a rivet 138 can be passed through corresponding elongated slots 140 formed through the latch element 134 and the side segment of the backrest frame 131. The backrest frame 131 and the latch element 134 can be thereby pivotally connected with the sidewalls 136 of the holder socket 133 about the pivot axis Y. The elongated slots 140 can extend generally parallel to a longitudinal axis Z of the side segment of the backrest frame 131. Moreover, the two parallel sidewalls 136 can have arc-shaped peripheral edges provided with a plurality of locking grooves 139 disposed at different radial directions relative to the pivot axis Y, and shoulder portions 141 respectively provided at the front and rear. The latch element 134 can have a side surface provided with a protruding stud 143 that can engage with any of the locking grooves 139 to hold the backrest frame 131 in different positions inclined forward or rearward. In one embodiment, the protruding stud 143 can be mounted with the latch element 134 and the side segment of the backrest frame 131 by passing through both of them. In addition, when the backrest frame 131 is adjusted to a forward or rearward position lying substantially horizontal (e.g., for placing the child in a sleeping position), the stud 143 of the latch element 134 can engage with one corresponding shoulder portion 141 to hold the backrest frame 131 in place.

Referring again to FIG. 2, the latch element 134 can have a tubular shape that includes an opening portion 134A where the backrest frame 131 is received, and a closed portion 134B opposite to the opening portion 134A. A spring 145 is received in the closed portion 134B of the latch element 134. The spring 145 can have a first end connected with the rivet 138, and a second end connected with the closed portion 134B of the latch element 134. With the rivet 138 passing through the corresponding elongated slots 140 of the latch element 134 and the backrest frame 131, the backrest frame 131 and the latch element 134 can also move in unison parallel to the longitudinal axis Z in addition to rotating movements. When the backrest frame 131 and the latch element 134 move upward along the longitudinal axis Z, the stud 143 can disengage from any of the locking grooves 139. When the backrest frame 131 is released, the action of the spring 145 can push the closed portion 134B to move the latch element 134 and the backrest frame 131 downwardly and cause the stud 143 to engage with any of the locking grooves 139. It is worth noting that other constructions for the latch element 134 may be possible. For example, the latch element 134 may also be formed integral with the backrest frame 131 without the need of extra assembly operations. In alternate embodiments, the latch element can also be movably mounted with the side segment of the backrest frame 131, whereby the latch element can slide along the longitudinal axis Z relative to the backrest frame to accomplish locking and unlocking operations.

Figure 3:
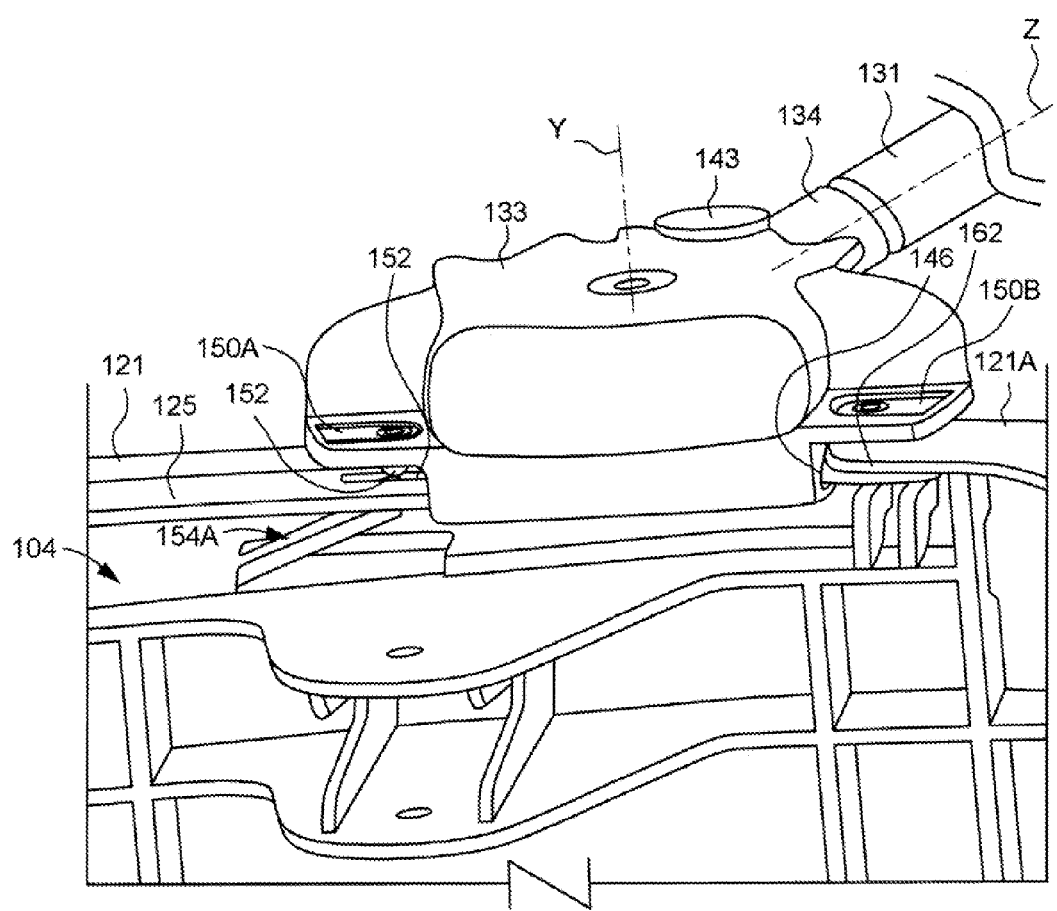
FIG. 3 is a schematic view illustrating the assembly of holder socket and the seat assembly in the infant carrier apparatus.
Figure 8:
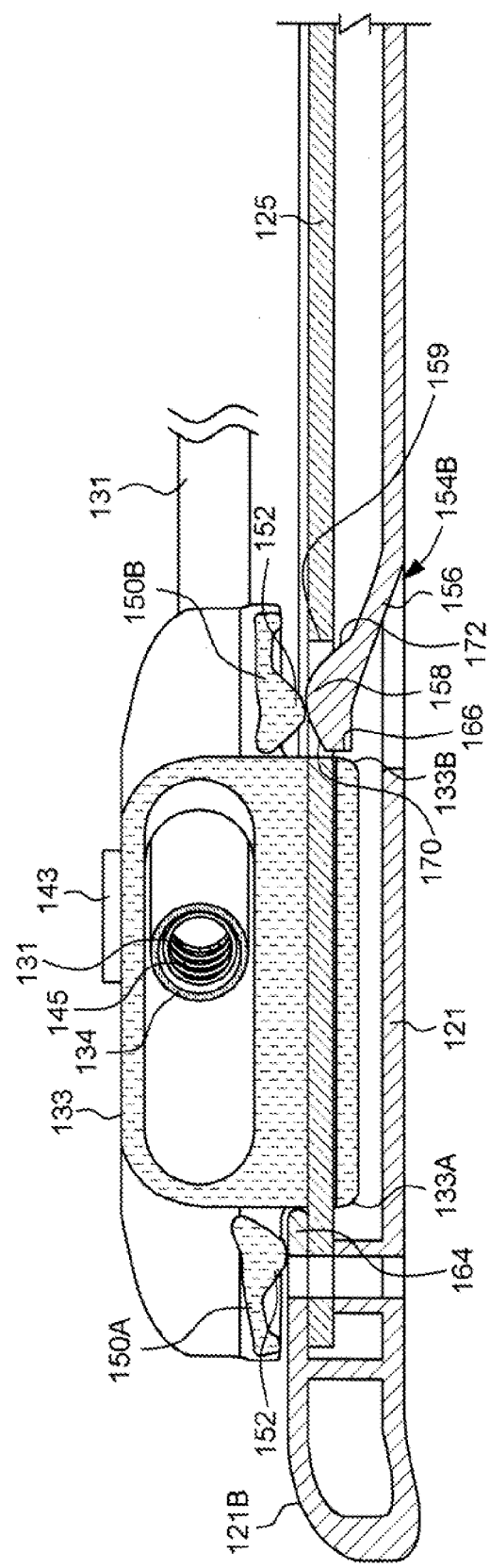
FIG. 8 is a schematic cross-sectional view illustrating the holder socket located at a front position of the seat assembly.

FIG. 3 is a schematic bottom view illustrating the assembly of the holder socket 133 and seat assembly 104. A side of the holder socket 133 can include a swell portion through which is formed a guide slot 146. The holder socket 133 can be movably assembled such that the guide rail 125 passes through the guide slot 146. The holder socket 133 can also include actuator portions 150A and 150B respectively provided in front of and behind the guide slot 146. Each of the actuator portions 150A and 150B can include a drive protrusion 152 projecting toward the guide rail 125. The guide rail 125 can have front and rear ends respectively affixed with the side surface of the seat board 121 at the front and rear portions thereof. While the illustrated embodiment affixes the guide rail 125 at a side of the seat board 121, alternate embodiments can also place the guide rail 125 at other locations of the support frame 102, e.g., along a bar linkage (not shown) of the support frame 102 that extends along the side edge of the seat board 121. The seat board 121 can also include a plurality of restraint elements, e.g., a restraint element 154A placed adjacent to a rear end 121A of the seat board 121 as shown in FIG. 3, and a restraint element 154B placed adjacent to a front end 121B of the seat board 121 as shown in FIG. 8. In one embodiment, each of the restraint elements 154A and 154B can be a unidirectional restraint element that is adapted to block a displacement of the holder socket 133 in one direction. For example, the restraint element 154A shown in FIG. 3 can be adapted to block a displacement of the holder socket 133 from behind the restraint element 154A (i.e., the right hand side of FIG. 3) toward the front of the restraint element 154A (i.e., the left hand side of FIG. 3). In turn, the restraint element 154B shown in FIG. 8 can be adapted to block a displacement of the same holder socket 133 from the front of the restraint element 154B (i.e., the left hand side of FIG. 8) toward the rear of the restraint element 154B (i.e., the right hand side of FIG. 8).

Figure 4:
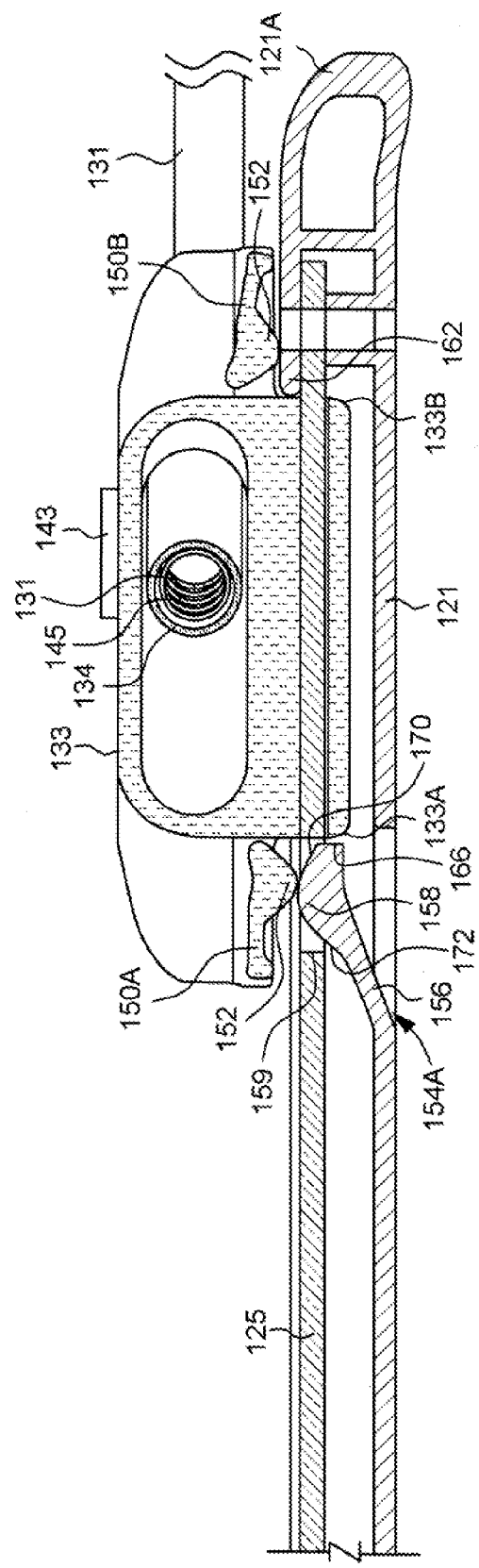
FIG. 4 is a schematic cross-sectional view taken along section C shown in FIG. 2 to illustrate the holder socket at a rear position of the seat assembly.

FIG. 4 is a schematic cross-sectional view taken along section C shown in FIG. 2 illustrating the holder socket 133 and the backrest frame 131 held adjacent to the rear end of the seat assembly 104. Referring to FIGS. 3 and 4, the restraint element 154A can be formed from a resilient arm 156. The resilient arm 156 can have a first end connected with an inner side of the seat board 121, and a second end extending toward the guide rail 125 to form a protuberance 158. The guide rail 125 can include a hole 159 at a position corresponding to the protuberance 158, such that the protuberance 158 can be exposed through the hole 159 at the opposite side of the guide rail 125. Owing to the elasticity of the resilient arm 156, the restraint element 154A can be deflectable or movable between a locked position and an unlocked position to either block or allow a forward displacement (i.e., toward the left hand side of FIG. 4) of the holder socket 133 relative to the guide rail 125. In addition, the guide rail 125 can include a stop portion 162 provided at a rear of the restraint element 154A. The stop portion 162 can abut against a rear surface 133B of the holder socket 133 to prevent excessive rearward displacement (i.e., toward the right hand side of FIG. 4) of the holder socket 133. The protuberance 158 of the restraint element 154A can also include an abutment surface 166. As shown in FIG. 4, when the restraint element 154A is in the locked position, the abutment surface 166 can contact with a front surface 133A of the holder socket 133 to block forward displacement of the holder socket 133 along the guide rail 125. Moreover, the protuberance 158 of the restraint element 154A can also include a first angled surface 170, and a second angled surface 172 at a side opposite to the angled surface 170.

FIG. 8 is a schematic cross-sectional view illustrating the holder socket 133 and the backrest frame 131 adjusted to a position adjacent to the front end of the seat assembly 104. As shown in FIGS. 4 and 8, the restraint element 154B is provided near the front end of the guide rail 125 oppositely symmetrical to the restraint element 154A. Likewise, the restraint element 154B can be formed from a resilient arm 156 having a first end connected with an inner side of the seat board 121, and a second end extending toward the guide rail 125 to form a protuberance 158. The guide rail 125 can include a hole 159 at a position corresponding to the protuberance 158, such that the protuberance 158 can be exposed through the hole 159 at the opposite side of the guide rail 125. Owing to the elasticity of the resilient arm 156, the restraint element 154B can be deflectable between a locked position and an unlocked position to either block or allow a rearward displacement (i.e., toward the right hand side of FIG. 8) of the holder socket 133 relative to the guide rail 125. In addition, the guide rail 125 can include a stop portion 164 provided adjacently in front of the restraint element 154B. The stop portion 164 can abut against a front surface 133A of the holder socket 133 to prevent excessive forward displacement (i.e., toward the left hand side of FIG. 8) of the holder socket 133. When a user wants to adjust the holder socket 133 from the rear position (or front position) to the front position (or rear position), the actuator portions 150A and 150B can be operated to release the locking engagement of the restraint element 154A (or restraint element 154B) for allowing the holder socket 133 to slide along the guide rail 125.

Exemplary adjustment of the holder socket 133 and backrest frame 131 is described hereafter with reference to FIGS. 4 through 8. In FIG. 4, suppose that the holder socket 133 and the backrest frame 131 are located at the rear position of the seat board 121. The restraint element 154A can be in the locked state, i.e., the abutment surface 166 of the protuberance 158 can contact with the front surface 133A of the holder socket 133 to prevent the holder socket 133 to move forward along the guide rail 125. Moreover, the stop portion 162 can contact with the rear surface 133B of the holder socket 133 to prevent the holder socket 133 from moving rearward. The drive protrusion 152 of the actuator portion 150A can be located approximately in alignment with the hole 159 of the guide rail 125 and the protuberance 158 of the restraint element 154A.

Figure 5:
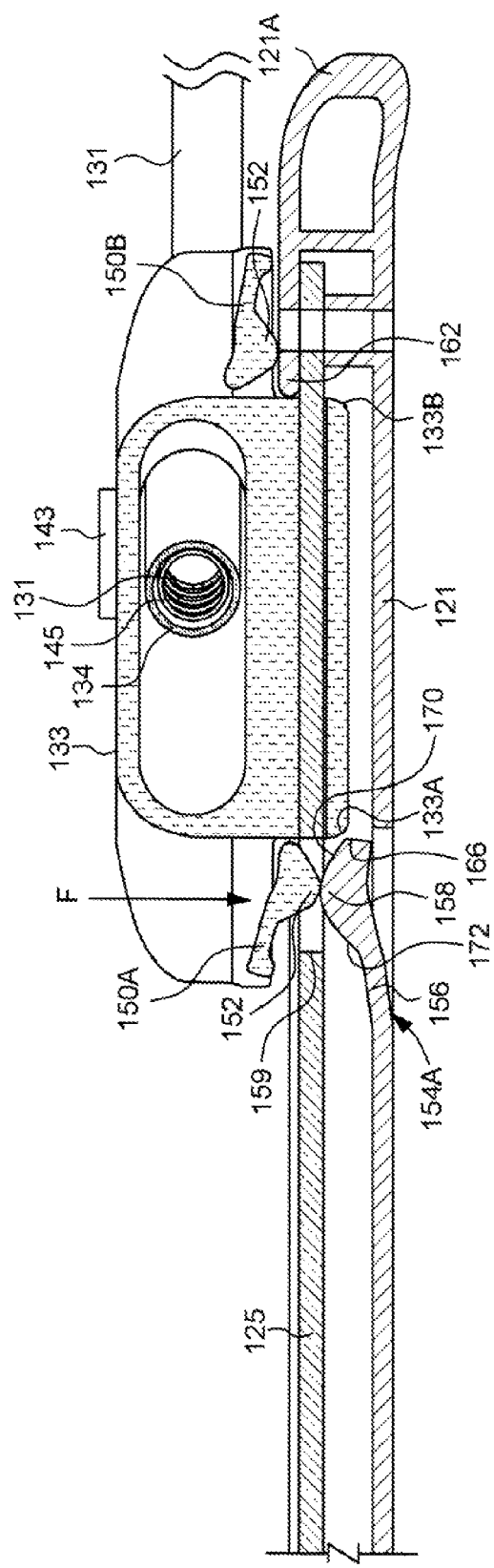
FIG. 5 is a schematic cross-sectional view illustrating an operation for removing a locking engagement of a restraint element.
Figure 6:
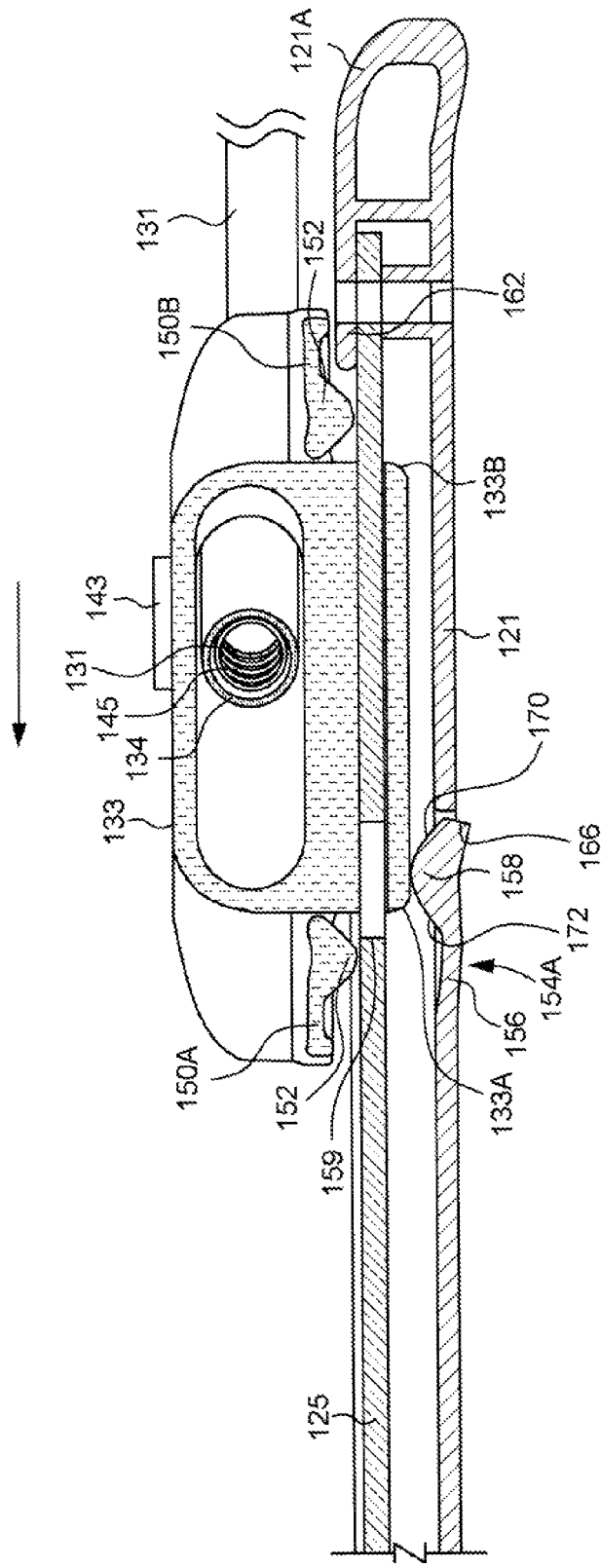
FIG. 6 is a schematic cross-sectional view illustrating a forward displacement of the holder socket from the rear position of the seat assembly and passing by the restraint element.

Referring to FIG. 5, when the user wants to adjust the holder socket 133 and the backrest frame 131 from the rear position of the seat board 121 to the front position, a pressure F can be applied on the actuator portion 150A of the holder socket 133. As a result, the drive protrusion 152 can push outward the protuberance 158 of the restraint element 154A toward the seat board 121, which causes the abutment surface 166 of the protuberance 158 to disengage from its contact with the front surface 133A of the holder socket 133. As the abutment surface 166 disengages from the front surface 133A, the locking engagement of the restraint element 154A can be removed, and the holder socket 133 can be driven to slide forward along the guide rail 125 parallel to the longitudinal axis X. Moreover, the front surface 133A of the holder socket 133 can come into contact with the angled surface 170 of the restraint element 154A and further push outward the restraint element 154A. Accordingly, the restraint element 154A can shift to the unlocked position, which allows the holder socket 133 to pass by the restraint element 154A and continue to slide forward along the guide rail 125, as shown in FIG. 6.

Figure 7:
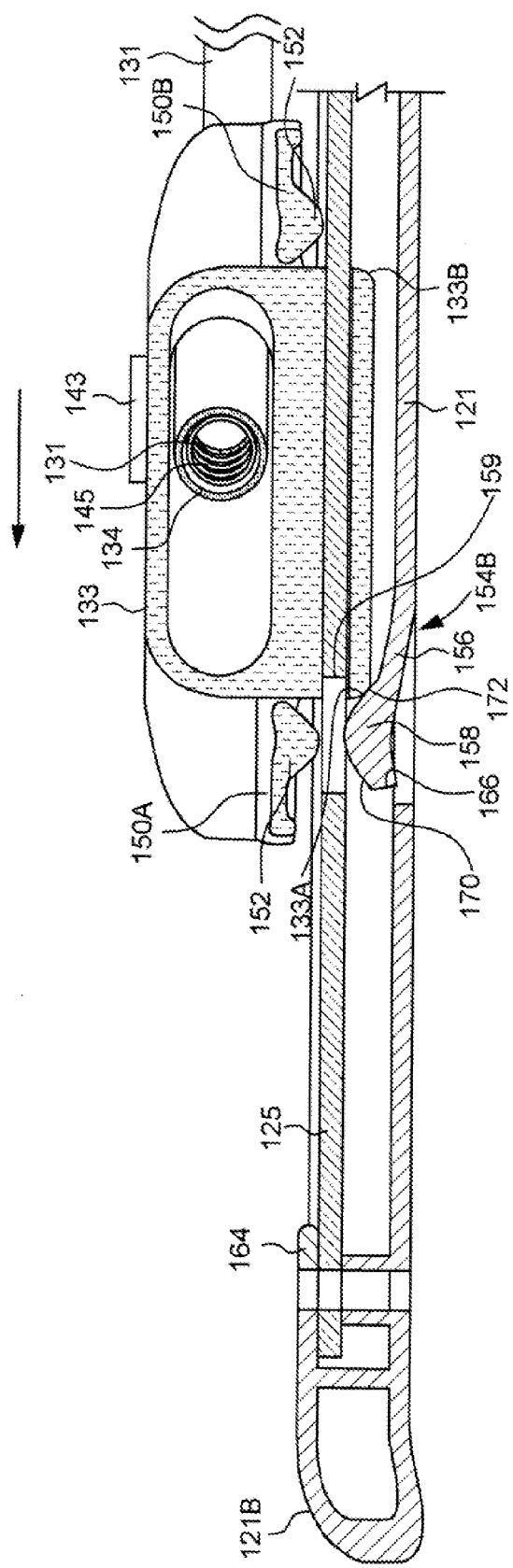
FIG. 7 is a schematic cross-sectional view illustrating a forward displacement of the holder socket passing by another restraint element.

Next referring to FIG. 7, as the holder socket 133 moving forward parallel to the longitudinal axis X approaches the front of the seat board 121, the front surface 133A of the holder socket 133 can contact with the angled surface 172 of the restraint element 154B and push outward the protuberance 158 of the restraint element 154B. As a result, the restraint element 154B can disengage from its locking engagement and shifted to the unlocked position. The holder socket 133 then can pass by the restraint element 154B.

Next referring to FIG. 8, as the holder socket 133 further moves forward and reaches its front position, the front surface 133A of the holder socket 133 can contact with the stop portion 164, and the restraint element 154B can elastically recover the locked position. At this time, the abutment surface 166 on the protuberance 158 of the restraint element 154B can abut against the rear surface 133B of the holder socket 133 to block rearward displacement of the holder socket 133. Accordingly, the backrest frame 131 can be held at the front position of the seat board 121.

Figure 9:
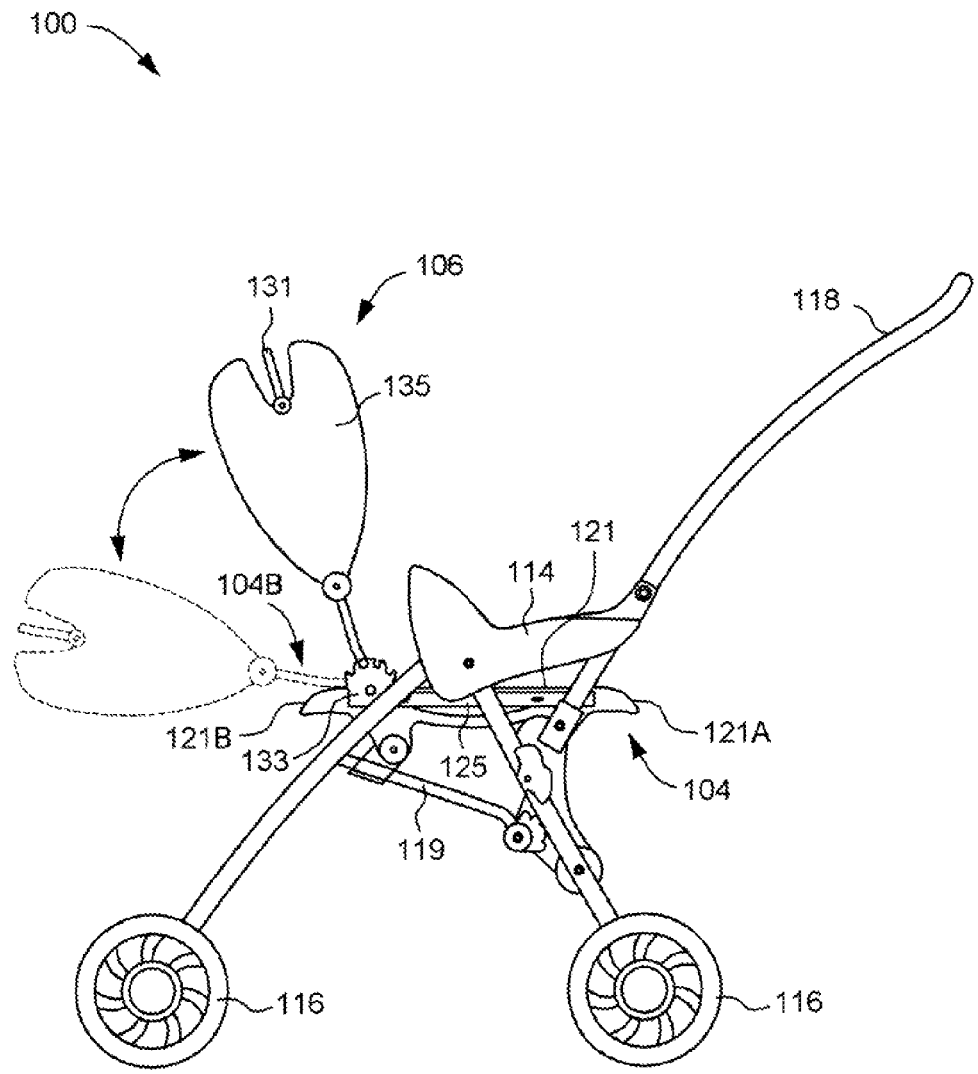
FIG. 9 is a schematic view illustrating the infant carrier apparatus provided with the backrest assembly adjusted to the front position of the seat assembly.

FIG. 9 is a schematic view illustrating the infant carrier apparatus 100 with the backrest assembly 106 held at the front position of the seat assembly 104. When the backrest frame 131 is placed at the front position of the seat assembly 104, the backrest frame 131 can be adjusted to incline forward such that the seat board 121 and the backrest frame 131 can define a space adapted to seat a child facing rearward. According to the needs, the backrest frame 131 can also be desirably adjusted forward to a substantially horizontal position (as shown with dotted lines) to form a space adapted to receive a child in a horizontal sleeping position.

Referring to FIGS. 8 and 9, when the backrest assembly 106 is held at the front position of the seat assembly 104, the actuator portion 150B of the holder socket 133 can be approximately in alignment with the hole 159 of the guide rail 125 and the protuberance 158 of the restraint element 154B. In case the holder socket 133 and the backrest frame 131 are to be adjusted from the front position shown in FIG. 8 to the rear position shown in FIG. 4, the actuator portion 150B of the holder socket 133 can be depressed like described previously. As a result, the drive protrusion 152 can push outward the protuberance 158 of the restraint element 154B toward the seat board 121, which causes the abutment surface 166 of the protuberance 158 to disengage from its contact with the rear surface 133B of the holder socket 133. As the abutment surface 166 disengages from the rear surface 133B, the holder socket 133 can be driven to slide rearward along the guide rail 125 parallel to the longitudinal axis X. As a result, the rear surface 133B of the holder socket 133 can come into contact with the angled surface 170 on the protuberance 158 of the restraint element 154B and further push outward the restraint element 154B. Accordingly, the holder socket 133 can pass by the restraint element 154B and continue to slide rearward along the guide rail 125. As shown in FIG. 7, as the holder socket 133 moving rearward approaches the rear of the seat board 121, the rear surface 133B of the holder socket 133 can contact with the angled surface 172 on the protuberance 158 of the restraint element 154A and push outward the protuberance 158 of the restraint element 154A. As a result, the restraint element 154A can disengage from its locking engagement. The holder socket 133 then can pass by the restraint element 154A and reach the rear position shown in FIG. 4. When the holder socket 133 is held at the rear position, the restraint element 154A can elastically recover the locked position. In this locked position, the abutment surface 166 of the restraint element 154A can contact with the front surface 133A of the holder socket 133 to block forward displacement of the holder socket 133.

With the foregoing construction, the backrest assembly 106 can be desirably adjusted to a position adjacent to the front end of the seat assembly 104, or adjacent to a position adjacent to the rear end of the seat assembly 104. Accordingly, the infant carrier apparatus 100 can be desirably configured to a seating configuration facing forward, or a seating configuration facing rearward. Another advantage of the construction described herein is the ability to modify the seating configuration without the need of a larger seating area.

The restraint elements described herein can be respectively disposed at both the left and right guide rails to provide stable and secure locking engagement. However, it is understood that the restraint elements may also be provided on a single guide rail (e.g., either of the left or right guide rail). Moreover, while the foregoing embodiments exemplary apply to infant strollers, the features and advantages described herein can also be applicable to other types of infant carrier apparatuses, such as chairs, infant swings, and the like.

Realizations in accordance with the present invention therefore have been described only in the context of particular embodiments. These embodiments are meant to be illustrative and not limiting. Many variations, modifications, additions, and improvements are possible. Accordingly, plural instances may be provided for components described herein as a single instance. Structures and functionality presented as discrete components in the exemplary configurations may be implemented as a combined structure or component. These and other variations, modifications, additions, and improvements may fall within the scope of the invention as defined in the claims that follow.

What is claimed is:

1. An infant carrier apparatus comprising:
   a support frame, including a seat assembly that has a longitudinal axis extending from a front end to a rear end thereof, and a restraint element arranged at a fixed location on the support frame; and
   a backrest assembly, including a backrest frame and at least a holder socket, the holder socket being respectively assembled with the backrest frame and the support frame, and the holder socket having a release actuator portion and being adjustable along the longitudinal axis between a first position and a second position, the holder socket and the release actuator portion being movable in unison along with the backrest frame relative to the support frame;
   wherein the restraint element is operable to engage with the holder socket when the holder socket is in the first position to block displacement of the holder socket from the first position toward the second position, and the release actuator portion is operable to push against the restraint element while the holder socket is in the first position, so that the restraint element moves to disengage from the holder socket for allowing displacement of the holder socket from the first position toward the second position.

2. The infant carrier apparatus according to claim 1, wherein the first position is adjacent to the rear end or the front end of the seat assembly.

3. The infant carrier apparatus according to claim 1, wherein the first and second positions are respectively adjacent to the front and rear ends of the seat assembly, or vice-versa.

4. The infant carrier apparatus according to claim 1, wherein the support frame further includes at least a guide rail, and the holder socket is movable along the guide rail substantially parallel to the longitudinal axis.

5. The infant carrier apparatus according to claim 4, wherein the guide rail is affixed at one side of the seat assembly.

6. The infant carrier apparatus according to claim 1, wherein the restraint element includes a resilient arm, the resilient arm being biased to engage with the holder socket when the holder socket is in the first position.

7. The infant carrier apparatus according to claim 6, wherein the support frame further includes a guide rail along which the holder socket is movable for adjustment between the first and second position, and the resilient arm has a distal end that protrudes through an opening of the guide rail to engage with the holder socket for blocking displacement of the holder socket from the first position toward the second position.

8. The infant carrier apparatus according to claim 6, wherein while the holder socket is in the first position, the release actuator portion is operable to cause deflection of the resilient arm to disengage the resilient arm from the holder socket.

9. The infant carrier apparatus according to claim 6, wherein the restraint element further includes an angled surface, the holder socket moving toward the first position is adapted to come into contact with the angled surface to cause deflection of the resilient arm toward an unlocked position.

10. The infant carrier apparatus according to claim 1, wherein the backrest frame is pivotally connected with the holder socket about a pivot axis and has an end portion provided with a latch element, and the holder socket includes a plurality of locking grooves disposed at different radial directions relative to the pivot axis and adapted to receive the engagement of the latch element to hold the backrest frame at different inclinations.

11. A method of adjusting a backrest assembly of an infant carrier apparatus, wherein the infant carrier apparatus includes a support frame having a seat assembly, a backrest frame, and at least a holder socket that is assembled with the backrest frame and the support frame and has a first and a second release actuator, the support frame further including a first and a second restraint element that are arranged at two fixed locations spaced apart from each other on the support frame, the first and second restraint elements being respectively operable to retain the holder socket in a first and a second position spaced apart from each other, the method comprising:

while the holder socket is in the first position, causing the first restraint element to engage with the holder socket to block displacement of the holder socket toward the second position;

while the holder socket is in the first position, depressing the first release actuator so as to cause displacement of the first restraint element for disengaging the first restraint element from the holder socket;

moving the holder socket from the first position toward the second position, wherein the first and second release actuators move in unison with the holder socket relative to the support frame;

while the holder socket is in the second position, causing the second restraint element to engage with the holder socket to block displacement of the holder socket from the second position toward the first position;

while the holder socket is in the second position, depressing the second release actuator to cause displacement of the second restraint element for disengaging the second restraint element from the holder socket; and moving the holder socket from the second position toward the first position.

12. The method according to claim 11, wherein the step of moving the holder socket from the first position toward the second position comprises causing the holder socket to slide along a guide rail.

13. The method according to claim 11, wherein any of the first and second restraint elements is a unidirectional restraint element.

14. The method according to claim 11, wherein the backrest frame is pivotally connected with the holder socket about a pivot axis and has an end portion provided with a latch element, and the holder socket includes a plurality of locking grooves that are disposed at different radial directions relative to the pivot axis and are adapted to receive the engagement of the latch element to hold the backrest frame at different inclinations.

15. An infant carrier apparatus comprising:

a support frame, including a seat assembly that has a longitudinal axis extending from a front end to a rear end thereof, and a first and a second restraint element arranged at two spaced-apart fixed locations on the support frame along the longitudinal axis; and a backrest assembly, including a backrest frame and at least a holder socket, the holder socket being respectively assembled with the backrest frame and the support frame, the holder socket including a first and a second release actuator and being adjustable between a first position and a second position along the longitudinal axis, the holder socket and the first and second release actuators being movable in unison along with the backrest frame relative to the support frame;

wherein the first restraint element is operable to engage with the holder socket when the holder socket is in the first position to block displacement of the holder socket from the first position toward the second position, the first release actuator is operable to push against the first restraint element so that the first restraint element moves to disengage from the holder socket for allowing displacement of the holder socket from the first position toward the second position, the second restraint element is operable to engage with the holder socket when the holder socket is in the second position to block displacement of the holder socket from the second position toward the first position, and the second release actuator is operable to push against the second restraint element so that the second restraint element moves to disengage from the holder socket for allowing displacement of the holder socket from the second position toward the first position.

16. The infant carrier apparatus according to claim 15, wherein the first and second positions are respectively adjacent to the front and rear ends of the seat assembly, or vice-versa.

17. The infant carrier apparatus according to claim 15, wherein the support frame further includes at least a guide rail, and the holder socket is movable along the guide rail.

18. The infant carrier apparatus according to claim 15, wherein the first and second restraint element respectively include a first and a second resilient arm, the first resilient arm being biased to engage with the holder socket when the holder socket is in the first position, and the second resilient arm being biased to engage with the holder socket when the holder socket is in the second position.

19. The infant carrier apparatus according to claim 18, wherein the first release actuator is operable to cause deflection of the first resilient arm to disengage the first resilient arm from the holder socket when the holder socket is in the first position, and the second release actuator is operable to cause deflection of the second resilient arm to disengage the second resilient arm from the holder socket when the holder socket is in the second position.

20. The infant carrier apparatus according to claim 18, wherein the support frame further includes a guide rail along which the holder socket is movable for adjustment between the first and second position, and at least the first resilient arm has a distal end that protrudes through an opening of the guide rail to engage with the holder socket for blocking displacement of the holder socket from the first position toward the second position.

* * * * *